(12) United States Patent
Agapiou et al.

(10) Patent No.: US 10,995,253 B2
(45) Date of Patent: May 4, 2021

(54) LITHIUM-CONTAINING CALCIUM ALUMINATE PHOSPHATE CEMENT ADMIXTURES

(71) Applicant: Halliburton Energy Services, Inc., Houston, TX (US)

(72) Inventors: Kyriacos Agapiou, Houston, TX (US); Samuel J. Lewis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/315,048

(22) PCT Filed: Sep. 16, 2014

(86) PCT No.: PCT/US2014/055811
§ 371 (c)(1),
(2) Date: Nov. 30, 2016

(87) PCT Pub. No.: WO2016/043716
PCT Pub. Date: Mar. 24, 2016

(65) Prior Publication Data
US 2017/0183556 A1 Jun. 29, 2017

(51) Int. Cl.
*C09K 8/46* (2006.01)
*C04B 28/06* (2006.01)
(Continued)

(52) U.S. Cl.
CPC ............... *C09K 8/46* (2013.01); *C04B 22/04* (2013.01); *C04B 22/16* (2013.01); *C04B 28/06* (2013.01);
(Continued)

(58) Field of Classification Search
None
See application file for complete search history.

(56) References Cited

U.S. PATENT DOCUMENTS 6,332,921 B1 * 12/2001 Brothers ................. C04B 28/06
106/696
6,451,743 B1 9/2002 Fox
(Continued)

FOREIGN PATENT DOCUMENTS

| WO | WO 99/33763 | * | 7/1999 | ............. C04B 28/06 |
| WO | 2012165966 A1 | | 12/2012 | |
| WO | 2016043716 | | 3/2016 | |

OTHER PUBLICATIONS

API Recommended Practice 10A (2011).
(Continued)

*Primary Examiner* — Angela M DiTrani Leff
(74) *Attorney, Agent, or Firm* — Thomas Rooney; C. Tumey Law Group PLLC

(57) ABSTRACT

Lithium-containing cement admixtures including a calcium aluminate phosphate cement; a lithium-ion-containing compound; and an aqueous base fluid and methods of introducing the lithium-containing cement admixtures into a subterranean formation. The lithium-containing cement admixtures may further comprise an aluminosilicate or an additive including a set retarder, a set accelerator, a suspension aid, a density reducing agent, a fluid loss control agent, a defoamer, and any combination thereof.

13 Claims, 1 Drawing Sheet

(51) Int. Cl.
*C09K 8/467* (2006.01)
*C04B 28/34* (2006.01)
*C04B 22/04* (2006.01)
*C04B 22/16* (2006.01)
*C04B 111/00* (2006.01)

(52) U.S. Cl.
CPC .............. *C04B 28/34* (2013.01); *C09K 8/467* (2013.01); *C04B 2111/00146* (2013.01); *Y02W 30/91* (2015.05)

(56) References Cited

U.S. PATENT DOCUMENTS

| | | |
|---|---|---|
| 6,835,243 B2 | 12/2004 | Brothers et al. |
| 6,953,090 B2 | 10/2005 | Vijn et al. |
| 7,381,252 B2 | 6/2008 | Rhodes et al. |
| 7,381,263 B2 | 6/2008 | Roddy et al. |
| 7,530,395 B2 | 5/2009 | Reddy et al. |
| 7,740,066 B2 | 6/2010 | Xu et al. |
| 8,557,036 B1 | 10/2013 | Chatterji et al. |
| 8,627,888 B2 | 1/2014 | Santra et al. |
| 8,685,901 B2 | 4/2014 | Xu et al. |
| 8,720,568 B2 | 5/2014 | Todd et al. |
| 2004/0040474 A1* | 3/2004 | Perez-Pena ............. C04B 28/04 106/808 |
| 2005/0051058 A1 | 3/2005 | Shimanovich |
| 2007/0056730 A1* | 3/2007 | Keese ...................... C09K 8/16 166/291 |
| 2008/0182764 A1* | 7/2008 | Xu .......................... C04B 28/06 507/269 |
| 2008/0302276 A1 | 12/2008 | Perez-Pena et al. |
| 2012/0022023 A1* | 1/2012 | Engqvist ................ A61L 27/12 514/102 |
| 2012/0325478 A1 | 12/2012 | Muthusamy et al. |
| 2013/0126166 A1 | 5/2013 | Karcher et al. |
| 2014/0109799 A1* | 4/2014 | Revil ..................... C04B 28/06 106/676 |
| 2014/0343194 A1* | 11/2014 | Taquet .................... C04B 28/06 524/5 |
| 2015/0239784 A1* | 8/2015 | Cowan .................. E21B 33/143 166/277 |

OTHER PUBLICATIONS

API Recommended Practice 10B-2 (2013).
Berard et al., Foamed CaP Cement Enables Drilling and Cementing of Geothermal Wells: Case History, Proceedings World Geothermal Congress (2010).
Lea's Chemistry on Cement and Concrete, 4th Ed., Ch. 13.8-13.8.3 (1998).
International Search Report and Written Opinion for PCT/US2014/055811 dated May 20, 2015.

* cited by examiner

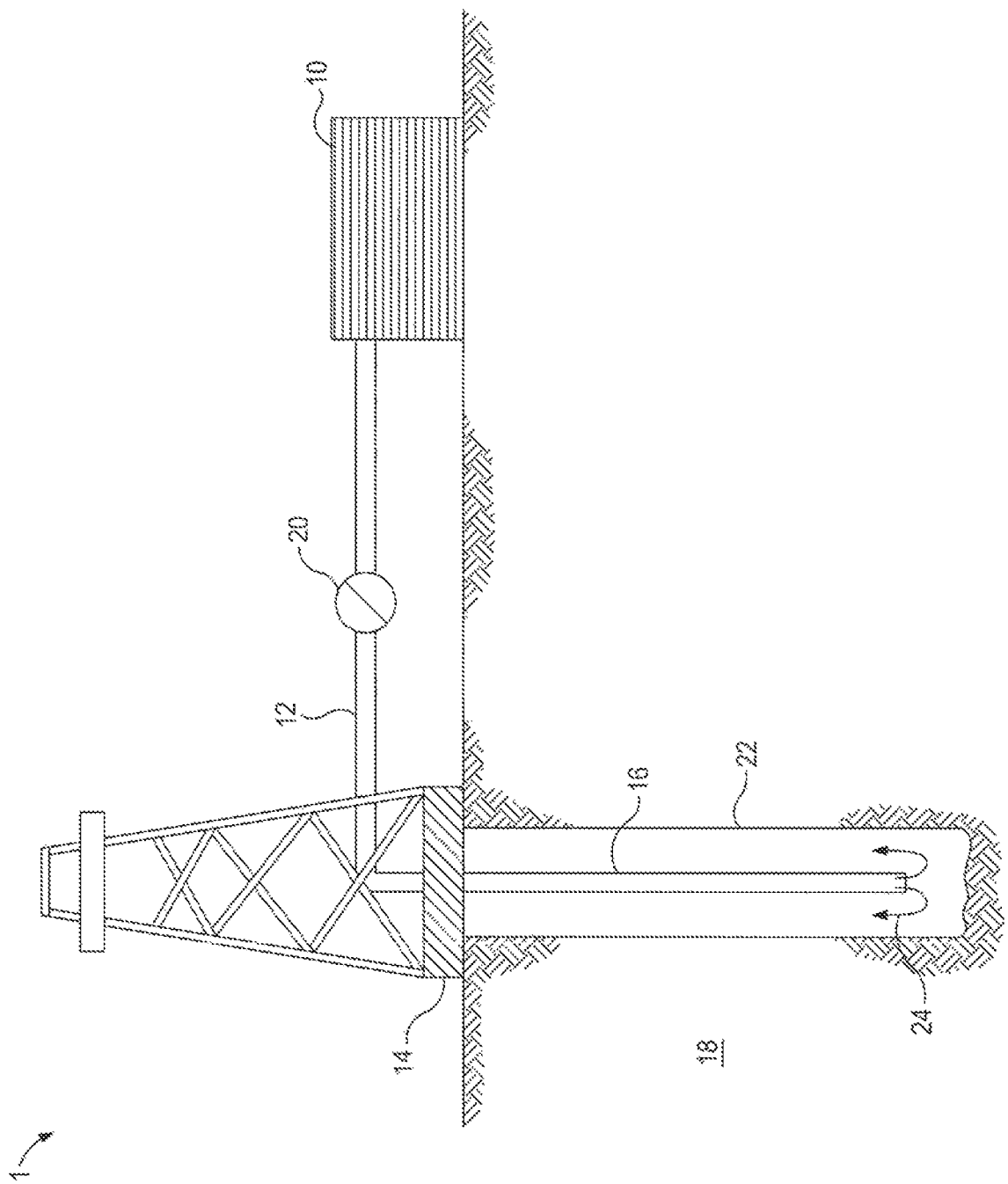

LITHIUM-CONTAINING CALCIUM ALUMINATE PHOSPHATE CEMENT ADMIXTURES

BACKGROUND

The embodiments herein relate generally to subterranean formation operations and, more particularly, to lithium-containing calcium aluminate phosphate admixtures.

Subterranean formation operations (e.g., stimulation operations, sand control operations, completion operations, etc.) often involve placing a cement column around a casing (or liner string) in a wellbore. In some instances, the cement column is formed by pumping a cement slurry through the bottom of the casing and out through an annulus between the outer casing wall and the formation face of the wellbore. The cement slurry then cures in the annular space, thereby forming a sheath of hardened cement that, inter alia, supports and positions the casing in the wellbore and bonds the exterior surface of the casing to the subterranean formation. This process is referred to as "primary cementing." Among other things, the cement column may keep fresh water zones from becoming contaminated with produced fluids from within the wellbore. As used herein, the term "fluid" refers to liquid phase fluids and gas phase fluids. The cement column may also prevent unstable formations from caving in, thereby reducing the chance of a casing collapse and/or stuck drill pipe. Finally, the cement column may also form a solid barrier to prevent fluid loss from the wellbore into the formation and the contamination of production zones with wellbore fluids. Remediation for these issues of a cement column after primary cementing operations is referred to as "secondary cementing," and may be costly in terms of equipment, materials, and operator time.

The degree of success of a subterranean formation operation involving placement of a cement column therefore depends, at least in part, upon the successful cementing of the wellbore casing. Cement slurries are typically designed to have a hydrostatic pressure between the formation pore pressure and the fracture gradient of the formation to prevent fluid migration within the cement slurry and prevent fracturing of the subterranean formation. As used herein, the term "formation pore pressure" refers to the pressure of the subsurface formation fluids within the subterranean formation itself. As used herein, the term "fracture gradient" refers to the pressure required to induce or enhance fractures in a subterranean formation at a given depth. During cement hydration, the hydrostatic pressure of the cement slurry decreases and it may drop below the formation pore pressure, allowing fluid invasion and migration within the cement slurry, a common obstacle of primary cementing. As used herein, the term "cement hydration" (or "cement setting") refers to the process of transforming a cement slurry into a solid, hardened mass, and the term "hydrating cement slurry" refers to the cement slurry itself which has not fully hydrated and become a solid, hardened mass.

The duration of cement hydration is critical to a cementing operation. For example, cement slurries must remain in liquid form for a period of time sufficient to pump the slurry through the casing and into the annular space, including calculated unavoidable delay time. Premature setting of the slurry results in hardened cement masses in unwanted areas in equipment, the wellbore, or the annular space, which may require costly remedial operations and production delay. Conversely, a cement slurry that takes a prolonged period of time to set after being placed in the annular space can result in significant wait on cement ("WOC") time and delay drill out, both of which increase rig time and operator time. This pump time for a particular cement slurry depends on, at least in part, the composition of the slurry, the conditions of the subterranean formation (e.g., temperature), the pump rate, and the like. The term "pump time," as used herein, refers to the time required to reach a consistency of the cement such that it is no longer deemed pumpable, defined herein as a consistency of greater than about 50 Bearden units of consistency ("Bc"), or greater than about 70 Bc, or greater than about 95 Bc. As used herein, the term "consistency" refers to a rheological property of a cement related to the cohesion of individual components of the cement, its ability to deform, and its ability to resist flow.

One type of cement is a calcium aluminate phosphate ("CAP") cement. CAP cements have been used in primary cementing operations due to their ability to set in desired timeframes and provide desired compressive strengths in geothermal wells with relatively high temperatures, or at least upwards of 60° C. (140° F.). However, some subterranean formations having hydrocarbon reservoirs exhibit much lower temperature ranges (e.g., below about 60° C. (140° F.), or below about 54° C. (130° F.), or below about 50° C. (120° F.)), where the heat of the subterranean formation is not able to aid in setting the CAP cement. Moreover, regardless of the formation temperature, lower density CAP cements may fail to achieve desired pump times and compressive strengths.

BRIEF DESCRIPTION OF THE DRAWINGS

The following FIGURES is included to illustrate certain aspects of the embodiments disclosed herein, and should not be viewed as an exclusive embodiment. The subject matter disclosed is capable of considerable modifications, alterations, combinations, and equivalents in form and function, as will occur to those skilled in the art and having the benefit of this disclosure.

The FIGURE depicts an embodiment of a system configured for delivering the lithium-containing cement admixtures of the embodiments described herein to a downhole location.

DETAILED DESCRIPTION

The embodiments herein relate generally to subterranean formation operations and, more particularly, to lithium-containing calcium aluminate phosphate admixtures.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, the present disclosure provides a lithium-containing cement admixture ("LCCA") comprising a calcium aluminate phosphate ("CAP") cement, a lithium-ion containing compound, and an aqueous base fluid. As used herein, the term "lithium-ion containing compound" refers to a compound that includes a lithium ion (e.g., a lithium-containing salt) or any compound capable of supplying a lithium ion (e.g., a compound that undergoes a chemical reaction to supply a lithium ion).

Lithium compounds have been used in conjunction with calcium aluminate ("CA") cements. The combination of calcium aluminate phosphate cements and lithium-ion containing compounds have not been used, perhaps due to their relatively quick set reactivity in many subterranean formation conditions. However, the combination of the CAP cement and the lithium-ion containing compound synergistically operate together to both accelerate the setting time of the LCCA and increase the compressive strength of the LCCA, as compared to a CAP cement alone, even at low temperatures. Moreover, the pump time and compressive strength of the LCCA may be manipulated or fine-tuned depending on the relative concentrations of the CAP cement and the concentration and type of lithium-ion containing compounds selected in forming the particular LCCA.

In some embodiments, the LCCA may be introduced into a subterranean formation. The LCCA may be introduced into the subterranean formation through a wellbore and up through an annular space between a casing string and the formation face. In other embodiments, the LCCA may be introduced into the subterranean formation through the annular space between a casing string and the formation face in a wellbore (i.e., "reverse cementing"). Once therein, the LCCA may set to form cement column in the subterranean formation, as discussed previously. In other embodiments, the LCCA may be used not only in primary cementing operations, but also in secondary cementing operations. The secondary cementing operations may include any remedial operation performed on the primary cement column including, for example, a cement squeeze operation, formation of a cement plug, and the like. Moreover, the LCCA compositions described herein may be used in any other operation that may benefit from their accelerated and compressively strong qualities, particularly at low temperature and densities, including within and outside of the oil and gas industry.

In some embodiments, the LCCA of the present disclosure demonstrates the pump times and compressive strengths described herein at a wide range of temperatures, such as any temperatures encountered in a subterranean formation, as well as any temperatures less than or greater than those encountered in a subterranean formation. For example, the LCCA of the present disclosure may be used in environments having a temperature of less than about 371° C. (700° F.), less than about 316° C. (600° F.), less than about 260° C. (500° F.), less than about 204° C. (400° F.), less than about 150° C. (300° F.), less than about 93° C. (200° F.), less than about 38° C. (100° F.), less than about 10° C. (50° F.), or less than about −4° C. (25° F.), encompassing any value and subset therebetween.

In some embodiments, the LCCA exhibits the pump times and compressive strengths described herein at low temperatures, a subset of the wide range of temperature environments in which the LCCA can be used. As used herein, the term "low temperature" refers to a temperature of less than about 50° C. (less than about 120° F.). In some embodiments, the low temperatures in which the LCCA of the present disclosure demonstrates the pump times and compressive strengths disclosed herein may range from a lower limit of about −4° C., −2° C., 0° C., 2° C., 4° C., 6° C., 8° C., 10° C., 12° C., 14° C., 16° C., 18° C., 20° C., 22° C., 24° C., and 26° C. to an upper limit of about 50° C., 48° C., 46° C., 44° C., 42° C., 38° C., 36° C., 34° C., 32° C., 30° C., 28° C., and 26° C. (about 25° F. to about 122° F.), encompassing any value and subset therebetween. Exposure to these temperature ranges may be in a subterranean formation that itself exhibits a downhole temperature of less than about 50° C., or in some embodiments exhibits a downhole temperature of between about −1° C. and about 50° C., encompassing any value and subset therebetween.

Downhole temperatures may be determined using measurement while drilling ("MWD") techniques. MWD utilizes measurements taken of a wellbore during drilling operations that include temperature, as well as other measurements such as, for example, pressure, density, porosity, wellbore inclination, and the like. Downhole temperature measurements may also be estimated based on geological conditions. Other techniques known in the art may also be employed to determine downhole temperature, without departing from the scope of the present disclosure.

In some embodiments, the LCCA described herein may exhibit a pump time at the disclosed temperature ranges ranging from a lower limit of about 90 minutes ("min"), 110 min, 130 min, 150 min, 170 min, 190 min, 210 min, 230 min, 250 min, 270 min, 290 min, 310 min, 330 min, 350 min, 370 min, 390 min, 410 min, 430 min, 450 min, 470 min, 490 min, 510 min, 530 min, and 550 min to an upper limit of about 1000 min, 980 min, 960 min, 940 min, 920 min, 900 min, 880 min, 860 min, 840 min, 820 min, 800 min, 780 min, 760 min, 740 min, 720 min, 700 min, 680 min, 660 min, 640 min, 620 min, 600 min, 580 min, 560 min, and 540 min, encompassing any value and subset therebetween.

In some embodiments, the LCCA described herein may form a "hydrated cement" exhibiting a compressive strength at 24 hours ranging from a lower limit of about 50 psi, 150 psi, 250 psi, 350 psi, 450 psi, 550 psi, 650 psi, 750 psi, 850 psi, 950 psi, 1050 psi, 1150 psi, 1250 psi, 1350 psi, 1450 psi, 1550 psi, 1650 psi, 1750 psi, 1850 psi, 1950 psi, 2050 psi, 2150 psi, 2250 psi, 2350 psi, 2450 psi, and 2550 psi to an upper limit of about 5000 psi, 4900 psi, 4800 psi, 4700 psi, 4600 psi, 4500 psi, 4400 psi, 4300 psi, 4200 psi, 4100 psi, 4000 psi, 3900 psi, 3800 psi, 3700 psi, 3600 psi, 3500 psi, 3400 psi, 3300 psi, 3200 psi, 3100 psi, 3000 psi, 2900 psi, 2800 psi, 2700 psi, 2600 psi, and 2500 psi, encompassing any value and subset therebetween. Compressive strength may be determined using standard testing methodology per the American Petroleum Institute ("API") Recommended Practice 10A (2011) and 10B-2 (2013). In some embodiments, at temperatures less than about 50° C., the LCCA described herein may exhibit a compressive strength of between about 100 psi to about 5000 psi, or about 200 psi to about 4000 psi, or about 300 psi to about 3000 psi, or about 400 psi to about 2000 psi, or about 500 psi to about 1000 psi, encompassing any value and subset therebetween.

In some embodiments, the LCCA described herein further exhibits the pump times and compressive strengths expressed in this disclosure at low density LCCA concentrations. As used herein, the term "low density LCCA" refers to an LCCA having a density ranging from a lower limit of about 4 pounds per gallon ("ppg"), 4.5 ppg, 5 ppg, 5.5 ppg, 6 ppg, 6.5 ppg, 7 ppg, 7.5 ppg, 8 ppg, 8.5 ppg, and 9 ppg to an upper limit of about 14 ppg, 13.5 ppg, 13 ppg, 12.5 ppg, 12 ppg, 11.5 ppg, 11 ppg, 10.5 ppg, 10 ppg, 9.5 ppg, and 9 ppg, encompassing any value and subset therebetween. However, the LCCA of the present disclosure may, in other embodiments, exhibit higher densities, such as those within the range of between a lower limit of about 10 ppg, 10.5 ppg, 11 ppg, 11.5 ppg, 12 ppg, 12.5 ppg, 13 ppg, 13.5 ppg, 14 ppg, 14.5 ppg, and 15 ppg to an upper limit of about 20 ppg, 19.5 ppg, 19 ppg, 18.5 ppg, 18 ppg, 17.5 ppg, 17 ppg, 16.5 ppg, 16 ppg, 15.5 ppg, and 15 ppg, encompassing any value and subset therebetween.

As previously discussed, the LCCA described herein comprises a CAP cement, a lithium-ion containing compound, and an aqueous base fluid.

CAP cements may be formed, for example, from an acid-base reaction between calcium aluminate (e.g., calcium aluminate cement) and an acidic phosphate-based solution, which may include monophosphates or polyphosphates. CAP cements may beneficially exhibit resistance to highly acidic environments. In some embodiments, the CAP cements of the present disclosure may comprise a calcium aluminate content ranging from a lower limit of about 20%, 22%, 24%, 26%, 28%, 30%, 32%, 34%, 36%, 38%, 40%, 42%, 44%, 46%, 48%, and 50% to an upper limit of about 80%, 78%, 76%, 74%, 72%, 70%, 68%, 66%, 64%, 62%, 60%, 58%, 56%, 54%, 52%, and 50% by weight of the CAP cement, encompassing any value and subset therebetween. In some embodiments, the phosphate content of the CAP cements including in the LCCA described in the present disclosure may range from a lower limit of about 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, and 10% to an upper limit of about 20%, 19.5%, 19%, 18.5%, 18%, 17.5%, 17%, 16.5%, 16%, 15.5%, 15%, 14.5%, 14%, 13.5%, 13%, 12.5%, 12%, 11.5%, 11%, 10.5% and 10% by weight of the CAP cement, encompassing any value and subset therebetween.

The lithium-ion containing compound, as discussed above, may be any compound that is capable of supplying a lithium ion. The lithium ion(s) supplied by the lithium-ion containing compound synergistically interacts with the CAP cement in the LCCA, accelerating pump time at low temperatures and in low density CAP cement concentrations, as well as, increasing compressive strength of the LCCA. For example, the LCCA of the present disclosure is particularly effective in low temperatures and/or low density slurries, as discussed above. Moreover, the lithium-ion containing compounds should not pose any or any significant environmental risk.

The relative concentrations of the CAP cement and lithium-ion containing compound in any particular LCCA can be adjusted so as to achieve a particular pump time and compressive strength. The type of lithium-ion containing compound may also be adjusted to achieve the desired pump time and compressive strength. The adjustments required will be readily apparent to one of skill in the art with the benefit of this disclosure and may depend on a number of parameters including, but not limited to, the temperature or other conditions of the subterranean formation, the type and specific operational parameters of a subterranean formation operation (e.g., the length of a wellbore to be cemented), any additives included in the LCCA that may affect the pump time and compressive strength, and the like.

In some embodiments, the CAP cement may be present in the LCCA in an amount ranging from a lower limit of about 1%, 2.5%, 5%, 10%, 12.5%, 15%, 17.5%, 20%, 22.5%, 25%, 27.5%, 30%, 32.5%, 35%, 37.5%, 40%, 42.5%, 45%, 47.5%, and 50% to an upper limit of about 99.99%, 97.5%, 95%, 92.5%, 90%, 87.5%, 85%, 82.5%, 80%, 77.5%, 75%, 72.5%, 70%, 67.5%, 65%, 62.5%, 60%, 57.5%, 55%, 52.5%, and 50% by weight of the LCCA, encompassing any value and subset therebetween.

In some embodiments, the lithium-ion containing compound is present in the LCCA in an amount ranging from a lower limit of about 0.1%, 0.2%, 0.4%, 0.6%, 0.8%, 1%, 1.2%, 1.4%, 1.6%, 1.8%, 2%, 2.2%, 2.4%, 2.6%, 2.8%, 3%, 3.2%, 3.4%, 3.6%, 3.8%, 4%, 4.2%, 4.4%, 4.6%, 4.8%, and 5% to an upper limit of about 10%, 9.8%, 9.6%, 9.4%, 9.2%, 9%, 8.8%, 8.6%, 8.4%, 8.2%, 8%, 7.8%, 7.6%, 7.4%, 7.2%, 7%, 6.8%, 6.6%, 6.4%, 6.2%, 6%, 5.8%, 5.6%, 5.4%, 5.2%, and 5% by weight of the CAP cement, encompassing any value and subset therebetween.

Although any compound capable of supplying a lithium ion may be used in the LCCA as the lithium-ion containing compound, in some embodiments, a lithium salt may be selected for use thereof. Suitable lithium salts for use as the lithium-ion containing compound may include, but are not limited to, a lithium carbonate, a lithium chloride, a lithium chloride hydrate, a lithium bromide, a lithium bromide hydrate, a lithium fluoride, a lithium iodide, a lithium iodide hydrate, a lithium borate, a lithium sulfate, a lithium sulfate hydrate, a lithium nitrate, a lithium hydroxide, a dilithium tetrabromonickelate, a dilithium tetrachlorocuprate, a lithium benzoate, a lithium cyclohexanbutyrate, a lithium formate, lithium hexafluoroarsenate, lithium hexafluorophosphate, lithium iodate, lithium metaborate, lithium phosphate, lithium perchlorate, lithium tetraborate, lithium tetrachloroaluminate, lithium tetrachloroaurate, lithium tetrachlorogallate, lithium tetrachloropalladate, lithium tetrafluoroborate, lithium trifluoromethanesulfonate, and any combination thereof.

The aqueous base fluid for forming the LCCA of the present disclosure may include, but is not limited to, fresh water, saltwater (e.g., water containing one or more salts dissolved therein), seawater, produced water, recycled water (e.g., from a treatment fluid previously used), or combinations thereof. The amount of salt in the aqueous base fluid may, in some instances, interfere with the setting time and/or compressive strength of the LCCA. Accordingly, the amount and type of CAP cement and/or lithium-ion containing compound should be adjusted to account for any such interferences, based on the present disclosure. Generally, the aqueous base fluid may be from any source, provided that it does not contain components that might adversely affect the stability and/or performance of any of the LCCA as a whole described herein. In certain embodiments, the density of the aqueous base fluid can be adjusted, among other purposes, to provide additional transport and suspension of the CAP cement and/or lithium-ion containing compound in the wellbore. In certain embodiments, the pH of the aqueous base fluid may be adjusted to a specific level, which may depend on, among other factors, the type of LCCA, any additives included in the LCCA, and the like. In some embodiments, the pH range may preferably be from about 4 to about 9.

In some embodiments, the aqueous base fluid may be present in the LCCA in an amount ranging from a lower limit of about 20%, 22.5%, 25%, 27.5%, 30%, 32.5%, 35%, 37.5%, 40%, 42.5%, 44%, 47.5%, and 50% to an upper limit of about 80%, 77.5%, 75%, 72.5%, 70%, 67.5%, 65%, 62.5%, 60%, 57.5%, 55%, 52.5%, and 50% by weight of the CAP cement, encompassing any value and subset therebetween.

In some embodiments, the LCCA herein may be foamed to aid in pumpability and/or placement of the LCCA at a desired location, such as in a subterranean location, or to adjust the density of the LCCA, for example. As used herein, the term "foam" refers to a two-phase composition having a continuous liquid phase and a discontinuous gas phase. In some embodiments, the LCCA may be foamed by the addition of a gas and a foaming agent.

Suitable gases for use in conjunction with the embodiments of the present disclosure may include, but are not limited to, nitrogen, carbon dioxide, air, methane, helium, argon, and any combination thereof. Each gas may be beneficial in certain subterranean environments. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen. Moreover, the higher density may impart greater particulate transport capability.

In some embodiments, the quality of the foamed LCCA may range from a lower limit of about 5%, 10%, 25%, 40%, 50%, 60%, or 70% gas volume to an upper limit of about 95%, 90%, 80%, 75%, 60%, or 50% gas volume, encompassing any value and subset therebetween. Most preferably, the foamed LCCA may have a foam quality from about 85% to about 95%, or about 90% to about 95%.

Suitable foaming agents for use in conjunction with the embodiments of the present disclosure may include, but are not limited to, cationic foaming agents, anionic foaming agents, amphoteric foaming agents, nonionic foaming agents, or any combination thereof. Nonlimiting examples of suitable foaming agents may include, but are not limited to, surfactants like betaines, sulfated or sulfonated alkoxylates, alkyl quarternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, or any combination thereof. Foaming agents may be included in any of the foamed LCCA at concentrations ranging typically from a lower limit of about 0.05%, 0.1%, 0.2%, 0.3%, 0.4%, 0.5%, 0.6%, 0.7%, 0.8%, 0.9%, and 1% to an upper limit of about 2%, 1.9%, 1.8%, 1.7%, 1.6%, 1.5%, 1.4%, 1.3%, 1.2%, 1.1%, and 1% of the liquid component (e.g., the aqueous base fluid) by weight (e.g., from about 0.5 to about 20 gallons per 1000 gallons of liquid).

In some embodiments, the LCCA may further comprise an aluminosilicate. Among other things, the aluminosilicate may react with excess lime to form a cementitious-like material. Because the aluminosilicate does not contribute to the properties of the CAP cement or the lithium-ion containing compound in the LCCA, it may synergistically enhance the strength and quality of the LCCA once it is set. Any aluminosilicate that is reactive to form a cementitious-like material may be used in the embodiments described herein. Suitable examples of aluminosilicates may include, but are not limited to, fly ash, vitrified shale, a natural pozzolan, silica fume, metakaolin, diatomaceous earth, calcined diatomite, uncalcined diatomite, calcined fullers earth, calcined volcanic ash, uncalcined volcanic ash, bagasse ash, pumice, pumicite, rice hull ash, a natural zeolite, a synthetic zeolite, slag, vitreous calcium aluminosilicate, and any combination thereof. In some embodiments, the aluminosilicate may be present in the LCCA in an amount in the range of between a lower limit of about 5%, 7.5%, 10%, 12.5%, 15%, 17.5%, 20%, 22.5%, 25%, 27.5%, 30%, 32.5%, 35%, 37.5%, 40%, and 42.5% to an upper limit of about 75%, 72.5%, 70%, 67.5%, 65%, 62.5%, 60%, 57.5%, 55%, 52.5%, 50%, 47.5%, 45%, and 42.5% by weight of the CAP cement in the LCCA, encompassing any value and subset therebetween.

In some embodiments, the LCCA described herein may further comprise a cement additive including, but not limited to, a set retarder, a set accelerator, a suspension aid, a density reducing agent, a fluid loss control agent, a defoamer, and any combination thereof. In some embodiments, one or more of the specific additives may serve one or more of the functions described below.

Inclusion of the set retarder may delay the pump time of the LCCA, such as to fine tune its setting for a particular subterranean formation or subterranean formation operation. Suitable set retarders for use in the LCCA herein may be any material capable of delaying the pump time of the LCCA without substantially adversely interfering with its compressive strength. As used herein, the term "substantially" means largely, but not necessarily wholly. In some embodiments, suitable set retarders may include, but are not limited to, citric acid, delta gluconolactone, tartaric acid, lignosulfate, a metal salt of lignosulfonate, 2-acrylamide-2-methylpropane sulfonic acid/acrylic acid copolymer, 2-acrylamide-2-methylpropane sulfonic acid/maleic acid copolymer, itaconic acid, gluconic acid, oleic acid, phosphoric acid, uric acid, ammonium, an alkali metal, an alkaline earth metal, borax, a hydroxycarboxy acid, and any combination thereof. In some embodiments, the set retarder may be present in the LCCA of the present disclosure in an amount in the range of between a lower limit of about 0.01%, 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.05%, 1.1%, 1.15%, 1.2%, and 1.25% to an upper limit of about 2.5%, 2.45%, 2.4%, 2.35%, 2.3%, 2.25%, 2.2%, 2.15%, 2.1%, 2.05%, 2%, 1.95%, 1.9%, 1.85%, 1.8%, 1.75%, 1.7%, 1.65%, 1.6%, 1.55%, 1.5%, 1.45%, 1.4%, 1.35%, 1.3%, and 1.25% by weight of the CAP cement in the LCCA, encompassing any value and subset therebetween.

A set accelerator may be used to hasten the setting time of the LCCA, again to fine tune its setting such as for use in a particular subterranean formation or particular subterranean formation operation, and may be any material capable of so doing without substantially adversely interfering with the compressive strength of the LCCA. In some embodiments, a set accelerator and a set retarder may be used in combination to fine tune the setting time of a particular LCCA. Suitable set accelerators may include, but are not limited to, sodium aluminate, aluminum sulfate, calcium chloride, calcium sulfate, gypsum-hemihydrate, sodium carbonate, sodium chloride, sodium silicate, sodium sulfate, ferric chloride, calcium hydroxide, sodium hydroxide, and any combination thereof. In some embodiments, the set accelerator may be present in the range of between a lower limit of about 0.01%, 0.1%, 0.5%, 1%, 1.5%, 2%, 2.5%, 3%, 3.5%, 4%, 4.5%, and 5% to an upper limit of about 10%, 9.5%, 9%, 8.5%, 8%, 7.5%, 7%, 6.5%, 6% 5.5%, and 5% by weight of the CAP cement in the LCCA, encompassing any value and subset therebetween.

Suspension aids may function to reduce or prevent the settling of the solid particulates (e.g., the CAP cement particulates) in the LCCA as it is being pumped into a wellbore, for example. In some embodiments, the suspension aid may reduce or prevent settling of the solid particulates in the LCCA by increasing the viscosity thereof. The suspension aid may be any material compatible with the LCCA and able to reduce or prevent the settling of solid particulates in the LCCA. In some embodiments, the suspension aid may be a partially or completely soluble polymer, an organically surface modified (e.g., organophilic clay, organophilic glass, organophilic mineral fibers), fibers (e.g., nanofibers), nanoparticulates, and any combination thereof. In some embodiments, the suspension aid may include, but are not limited to, diutan, silica, polyvinyl alcohol, a polyvinyl acetate, a hydroxypropyl cellulose, an ethyl cellulose, a polyvinyl pyrrolidone, a polyvinyl pyrrolidone/acrylic acid copolymer, xanthan, a cellulose, a cellulose derivative (e.g., hydroxyethyl cellulose, carboxyethylcellulose, carboxymethylcellulose, carboxymethylhydroxyethylcellulose, and the like), guar gum (e.g., hydroxyethyl guar, hydroxypropyl guar, carboxymethyl guar, carboxymethylhydroxyethyl guar, and carboxymethylhydroxypropyl guar ("CMHPG")), starch, derivatized guar, derivatized scieroglican acrylate, and polyacrylamide, a clay (e.g., bentonite, attapulgite, sepeolite, hectorite, and the like), scleroglucan, succinoglycan, and any combination thereof. In some embodiments, the suspension aid may be present in the range of between a lower limit of about 0.001%, 0.005%, 0.01%, 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.05%, 1.1%, 1.15%, 1.2%, and 1.25% to an upper limit of about 2.5%, 2.45%, 2.4%, 2.35%, 2.3%, 2.25%, 2.2%, 2.15%, 2.1%, 2.05%, 2%, 1.95%, 1.9%, 1.85%, 1.8%, 1.75%, 1.7%, 1.65%, 1.6%, 1.55%, 1.5%, 1.45%, 1.4%, 1.35%, 1.3%, and 1.25% by weight of the CAP cement in the LCCA, encompassing any value and subset therebetween.

Any material capable of reducing the density of the LCCA may be used in accordance with the present disclosure as a density reducing agent. Reducing the density of the LCCA may be used to fine tune setting times and/or compressive strength. In some embodiments, the density reducing agent may include, but is not limited to, hollow glass beads, an elastomer, perlite, cenospheres, hollow polymeric beads, hydrophobic silica powder, and any combination thereof. As discussed previously, the LCCA may additionally be foamed to achieve a density reduction. In some embodiments, the density reducing agent may be present in the range of from a lower limit of about 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, and 17.5% to an upper limit of about 30%, 29.5%, 29%, 28.5%, 28%, 27.5%, 27%, 26.5%, 26%, 25.5%, 25%, 24.5%, 24%, 23.5%, 23%, 22.5%, 22%, 21.5%, 21%, 20.5%, 20%, 19.5%, 19%, 18.5%, 18%, and 17.5% by weight of the CAP cement in the LCCA, encompassing any value and subset therebetween.

The fluid loss control agent in the LCCA may be present to prevent the aqueous base fluid in the LCCA from leaching or otherwise being lost into the subterranean formation. Fluid loss control may be used to control the rheological properties of the LCCA and to ensure proper bonding of the LCCA to a substrate (e.g., to the casing and the formation in primary cementing operations). The fluid loss control agent may be any material compatible with the LCCA that is capable of controlling fluid loss therefrom. Specific examples of suitable fluid loss control agents may include, but are not limited to, a latex (e.g., styrene butadiene latex), hydroxyethylcellulose, hydroxymethylcellulose, carboxymethylhydroxyethylcellulose, hydroxypropylcellulose, a 2-acrylamido-2-methyl propane sulfonic acid/N,N-dimethylacrylamide copolymer, a graft lignin a lignite polymer, starch, guar, hydroxypropylguar, polyethyleneimine, polyvinylalcohol, polyvinylacetate, carrageenan, xanthane, and any combination thereof. In some embodiments, the fluid loss control agent may be present in the range of between a lower limit of about 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, and 17.5% to an upper limit of about 30%, 29.5%, 29%, 28.5%, 28%, 27.5%, 27%, 26.5%, 26%, 25.5%, 25%, 24.5%, 24%, 23.5%, 23%, 22.5%, 22%, 21.5%, 21%, 20.5%, 20%, 19.5%, 19%, 18.5%, 18%, and 17.5% by weight of the CAP cement in the LCCA, encompassing any value and subset therebetween.

A defoamer may be included in the LCCA of the present disclosure to reduce the tendency for the LXCA to foam during mixing and pumping, or to fine tune a foamed LCCA. Any defoamer that is compatible with the LCCA may be used in accordance with the present disclosure. Specific defoamers may include, but are not limited to, a polyol silicone compound, a fatty acid, a vegetable oil, a polypropylene glycol, a low hydrophile-lipophile balance surfactant (e.g., having an HLB below about 10), a straight-chain n-alcohol, a non-ionic surfactant, graphite, aluminum stearate, a hydrophobically modified clay (e.g., a hydrophobic silica), a polyether modified polysilicane, a trialkane phosphate, a trialkene phosphate, and any combination thereof. In some embodiments, the defoamer may be present in the range of between a lower limit of about 0.01%, 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.05%, 1.1%, 1.15%, 1.2%, and 1.25% to an upper limit of about 2.5%, 2.45%, 2.4%, 2.35%, 2.3%, 2.25%, 2.2%, 2.15%, 2.1%, 2.05%, 2%, 1.95%, 1.9%, 1.85%, 1.8%, 1.75%, 1.7%, 1.65%, 1.6%, 1.55%, 1.5%, 1.45%, 1.4%, 1.35%, 1.3%, and 1.25% by weight of the CAP cement in the LCCA, encompassing any value and subset therebetween.

In various embodiments, systems configured for preparing, transporting, and delivering the LCCA described herein to a downhole location are described. In various embodiments, the systems can comprise a pump fluidly coupled to a tubular (e.g., a casing, drill pipe, production tubing, coiled tubing, etc.) extending into a wellbore penetrating a subterranean formation, the tubular may be configured to circulate or otherwise convey a LCCA described herein. The pump may be, for example, a high pressure pump or a low pressure pump, which may depend on, inter alia, the viscosity and density of the LCCA, the type of the cementing operation, and the like.

In some embodiments, the systems described herein may further comprise a mixing tank arranged upstream of the pump and in which the LCCA is formulated. In various embodiments, the pump (e.g., a low pressure pump, a high pressure pump, or a combination thereof) may convey the LCCA from the mixing tank or other source of the LCCA to the tubular. In other embodiments, however, the LCCA can be formulated offsite and transported to a worksite, in which case the LCCA may be introduced to the tubular via the pump directly from a transport vehicle or a shipping container (e.g., a truck, a railcar, a barge, or the like) or from a transport pipeline. In yet other embodiments, the LCCA may be formulated on the fly at the well site where components of the LCCA are pumped from a transport (e.g., a vehicle or pipeline) and mixed during introduction into the tubular. In any case, the LCCA may be drawn into the pump, elevated to an appropriate pressure, and then introduced into the tubular for delivery downhole.

The FIGURE shows an illustrative schematic of a system that can deliver LCCAs of the present invention to a downhOle location, according to one or more embodiments. It should be noted that while the FIGURE generally depicts a land-based system, it is to be recognized that like systems may be operated in subsea locations as well. As depicted in the FIGURE, system 1 may include mixing tank 10, in which a LCCA of the present invention may be formulated. Again, in some embodiments, the mixing tank 10 may represent or otherwise be replaced with a transport vehicle or shipping container configured to deliver or otherwise convey the LCCA to the well site. The LCCA may be conveyed via line 12 to wellhead 14, where the LCCA enters tubular 16 (e.g., a casing, drill pipe, production tubing, coiled tubing, etc.), tubular 16 extending from wellhead 14 into wellbore 22 penetrating subterranean formation 18. Upon being rejected from tubular 16, the LCCA may subsequently return up the wellbore in the annulus between the tubular 16 and the wellbore 22 as indicated by flow lines 24. In other embodiments, the LCCA may be reverse pumped down through the annulus and up tubular 16 back to the surface, without departing from the scope of the disclosure. Pump 20 may be configured to raise the pressure of the LCCA to a desired degree before its introduction into tubular 16 (or annulus). It is to be recognized that system 1 is merely exemplary in nature and various additional components may be present that have not necessarily been depicted in the FIGURE in the interest of clarity. Non-limiting additional components that may be present include, but are not limited to, supply hoppers, valves, condensors, adapters, joints, gauges, sensors, compressors, pressure controllers, pressure sensors, flow rate controllers, flow rate sensors, temperature sensors, and the like.

One skilled in the art, with the benefit of this disclosure, should recognize the changes to the system described in the FIGURE to provide for other cementing operations (e.g., squeeze operations, reverse cementing (where the cement is introduced into an annulus between a tubular and the wellbore and returns to the wellhead through the tubular), and the like).

It is also to be recognized that the disclosed LCCAs may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill hits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in the FIGURE.

Embodiments disclosed herein include:

Element A: A method comprising: providing a lithium-containing cement admixture ("LCCA") comprising a calcium aluminate phosphate cement, a lithium-ion containing compound, and an aqueous base fluid; introducing the LCCA into a subterranean formation.

Element B: A lithium-containing cement admixture ("LCCA") comprising: a calcium aluminate phosphate cement; a lithium-ion-containing compound; and an aqueous base fluid.

Element C: A system comprising: a wellhead with a tubular extending therefrom and into a subterranean formation; and a pump fluidly coupled to the tubular, the tubular comprising a lithium-containing cement admixture ("LCCA") comprising a calcium aluminate phosphate cement, a lithium-ion-containing compound, and an aqueous base fluid.

Embodiments A, B, and C may have one or more of the following additional elements in any combination:

Element 1: Wherein the LCCA has a pump time of between about 90 min to about 1000 min.

Element 2: Wherein the LCCA develops a compressive strength of between about 50 psi to about 5000 psi in about 24 hours.

Element 3: Further comprising forming a hydrated cement in at least a portion of a subterranean formation, the hydrated cement having a compressive strength of between about 50 psi to about 5000 psi in about 24 hours.

Element 4: Wherein the lithium-ion-containing compound is present in an amount in the range of about 0.1% to about 10% by weight of the calcium aluminate phosphate cement.

Element 5: Wherein the calcium aluminate phosphate cement has a calcium aluminate content in the range of about 20% to about 80% by weight of the calcium aluminate phosphate cement.

Element 6: Wherein the calcium aluminate phosphate cement has a phosphate content in the range of about 1% to about 20% by weight of the calcium aluminate phosphate cement.

Element 7: Wherein the calcium aluminate phosphate cement is present in an amount in the range of about 1% to about 99.99% by weight of the LCCA.

Element 8: Wherein the lithium-ion containing compound is present in an amount in the range of about 0.1% to about 10% by weight of the calcium aluminate phosphate cement.

Element 9: Wherein the aqueous base fluid is present in an amount in the range of about 20% to about 80% by weight of the calcium aluminate phosphate cement.

Element 10: Wherein the lithium-ion-containing compound is a lithium salt.

Element 11: Wherein the lithium-ion-containing compound is a lithium salt selected from the group consisting of a lithium carbonate, a lithium chloride, a lithium chloride hydrate, a lithium bromide, a lithium bromide hydrate, a lithium fluoride, a lithium iodide, a lithium iodide hydrate, a lithium borate, a lithium sulfate, a lithium sulfate hydrate, a lithium nitrate, a lithium hydroxide, a dilithium tetrabromonickelate, a dilithium tetrachlorocuprate, a lithium benzoate, a lithium cyclohexanbutyrate, a lithium formate, lithium hexafluoroarsenate, lithium hexafluorophosphate, lithium iodate, lithium metaborate, lithium phosphate, lithium perchlorate, lithium tetraborate, lithium tetrachloroaluminate, lithium tetrachloroaurate, lithium tetrachlorogallate, lithium tetrachloropalladate, lithium tetrafluoroborate, lithium trifluoromethanesulfonate, and any combination thereof.

Element 12: Wherein the LCCA further comprises an aluminosilicate.

Element 13: Wherein the LCCA further comprises a cement additive selected from the group consisting of a set retarder, a set accelerator, a suspension aid, a density reducing agent, a fluid loss control agent, a defoamer, and any combination thereof.

Element 14: Wherein the LCCA is foamed and further comprises a gas and a foaming agent.

By way of non-limiting example, exemplary combinations applicable to A, B, and C include: A with 1 and 2; A with 3, 4, and 6; A with 12 and 13; A with 7, 9, and 14; A 5, 8, and 10; B with 3 and 4; B with 6, 7, and 14; B with 12 and 13; B with 1, 2, 5, and 8; B with 9 and 10; C with 5 and 10; C with 1, 3, and 8; C with 2, 4, 13, and 14; C with 6, 7, and 12.

To facilitate a better understanding of the embodiments of the present disclosure, the following examples of preferred or representative embodiments are given. In no way should the following examples be read to limit, or to define, the scope of the disclosure.

Example 1

In this example, the thickening time (the test that measures pump time) and compressive strength of a CAP cement slurry composition was compared to a LCCA of the present disclosure.

First, the consistency and thickening time of the CAP cement batch was determined as a control ("Control Sample"), using a standard thickening time test and a pressurized consistometer. The Control Sample was prepared using 800 grams ("g") of CAP cement, 311 g of fresh water (39% by weight of the CAP cement), 8 g of a citric acid set retarder (1% by weight of the CAP cement), and 4 g of a delta-gluconolactone set retarder (0.5% by weight of the CAP cement). The Control Sample was tested at a temperature of 200° F. (93° C.) and a pressure of 10000 psi, under constant stirring. The CAP cement batch was considered consistent if reading under 30 Bearden Consistency units ("Bc") at a thickening time of under 30 minutes, and considered having an acceptable (passing) thickening time if 70 Bc was obtained after the elapse of at least 180 minutes. The results are shown in Table 1 and demonstrate that the CAP cement batch met the required quality standards.

TABLE 1

Control Sample Thickening Time Test

| Time (hh:mm) | Bc | Result |
|---|---|---|
| 00:00 | 5 | Consistent |
| 00:15 | 9 | Consistent |
| 00:30 | 6 | Consistent |
| 05:32 | 30 | — |
| 05:45 | 70 | Pass |
| 05:46 | 100 | Pass |

Next, two Test Cements were prepared using the quality CAP cement batch, Test Cement 1 and LCCA 1. Test Cement 1 was prepared using 800 grams ("g") of CAP cement and 311 g of fresh water (39% by weight of the CAP cement). LCCA 1 was prepared using 800 grams ("g") of CAP cement, 311 g of fresh water (39% by weight of the CAP cement), and 3.8 g of a lithium carbonate lithium-ion containing compound (0.5% by weight of the CAP cement). Each of Test Cement 1 and LCCA 1 were tested as described above for consistency and thickening time, except at a temperature of 100° F. (38° C.).

Pump time in this example was measured at 70 Bc. As shown in Table 2, Test Cement 1 reached 70 Bc after the elapse of 11 hours and 23 minutes, whereas LCCA 1 exhibited a much accelerated pump time of 3 hours and 45 minutes. Moreover, the addition of the lithium-ion containing compound in LCCA 1 did not negatively affect the rheology of the composition as compared to Test Cement 1, as evidenced by the stable consistency readings. The LCCA also exhibited "right-angle set" behavior, defined herein as a cement slurry that goes directly from a relatively low viscosity to a substantially hydrated cement having compressive strength without a substantial viscosity increase taking place in between, as evidence from the rapid setting from 30 Bc to 100 Bc (over only 3 minutes).

TABLE 2

| Test Sample 1 Thickening Time Test | | LCCA 1 Thickening Time Test | |
|---|---|---|---|
| Time (hh:mm) | Bc | Time (hh:mm) | Bc |
| 00:00 | 5 | 00:00 | 2 |
| 00:15 | 9 | 00:15 | 2 |
| 00:30 | 6 | 00:30 | 2 |
| 10:21 | 30 | 3:45 | 30 |
| 11:23 | 70 | 3:45 | 70 |
| 11:32 | 100 | 3:48 | 100 |

Example 2

The Test Cement 1 and LCCA 1 compositions of Example 1 were subjected to a standard non-destructive compressive strength test (API 10A and API 10B-2, as previously discussed) using an ultrasonic cement analyzer at a temperature of 38° C. (100° F.) and a pressure of 3000 psi (these test methods and parameters apply to the remaining examples employing compressive strength tests, unless otherwise specified). The time to reach 50 psi and 500 psi strength was recorded, as well as the compressive strength (in psi) after the elapse of 12 hours and 24 hours. The test was terminated ("Total Time") after the elapse of about 40 hours and again the compressive strength was tested. Finally, the pressure required to crush the cement composition was determined after the compressive strength test was terminated. The results are shown in Table 3.

As shown in Table 3, the compressive and crush strength of LCCA 1 was substantially improved as compared to Test Cement 1. For example, the time to reach 50 psi took 9 hours and 53 minutes for Test Cement 1 and only 2 hours and 14 minutes for LCCA 1. LCCA 1 took 5 hours and 21 minutes to reach 500 psi, whereas Test Cement 1 never reached such a compressive strength. Indeed, the compressive strength of Test Cement 1 plateaued at 24 hours at 164 psi, whereas the final compressive strength of LCCA 1 after the elapse of 39 hours and 21 minutes was 1038 psi. Further, the pressure required to crush Test Cement 1 was only 203 psi, whereas the pressure required to crush LCCA 1 was 1267 psi. The results indicate great improvement in compressive strength provided by the lithium-ion containing compound in LCCA 1.

TABLE 3

| Test Sample 1<br>Non-Destructive<br>Compressive Strength Test | | LCCA 1<br>Non-Destructive<br>Compressive Strength Test | |
|---|---|---|---|
| Parameter | Results | Parameter | Results |
| 50 psi (hh:mm) | 09:53 | 50 psi (hh:mm) | 02:14 |
| 500 psi (hh:mm) | — | 500 psi (hh:mm) | 05:21 |
| 12 hour (psi) | 111 | 12 hour (psi) | 666 |
| 24 hour (psi) | 164 | 24 hour (psi) | 860 |
| Total Time (hh:mm) | 39:48 | Total Time (hh:mm) | 39:21 |
| Total Time (psi) | 163 | Total Time (psi) | 1038 |
| Crush (psi) | 203 | Crush (psi) | 1267 |

Example 3

The Test Sample 1 and LCCA 1 compositions of Example 1 were also tested using a destructive compressive strength test at a low temperature of 100° F. (38° C.). Test Sample 1 and LCCA 1 were allowed to cure for 24 hours in a 100° F. water bath. Thereafter, the samples were crushed using a Tinius Olsen mechanical press. After 24 hours, Test Sample 1 did not gain appreciable strength under the test conditions, while LCCA 1 exhibited great strength due to the presence of the lithium-ion containing compound. The pressure required to crush Test Sample 1 was 44 psi, whereas the pressure required to crush LCCA 1 was 665 psi.

Example 4

In this example, the LCCA compositions of the present disclosure were compared to cement compositions comprising traditional set accelerator additives, among other additives. Three compositions were prepared, Test Sample 2, Test Sample 3, and LCCA 2, as shown in Table 4. In Table 4, the amount ("Amt") is expressed as a percent by weight of the CAP cement, and the grams ("g") represent the amount of material included by weight.

TABLE 4

| | Test Sample 2 | | Test Sample 3 | | LCCA 2 | |
|---|---|---|---|---|---|---|
| Material | Amt | (g) | Amt | (g) | Amt | (g) |
| CAP Cement | 100 | 113.34 | 100 | 111.21 | 100 | 111.53 |
| Set Accelerator<br>(Sodium<br>Aluminate) | — | — | 0.25 | 0.28 | — | — |
| Lithium-ion<br>Compound<br>(Li$_2$So$_4$•H$_2$O) | — | — | — | — | 0.25 | 0.28 |
| Set Retarder<br>(Citric Acid) | 0.75 | 0.84 | 0.75 | 0.84 | 0.75 | 0.84 |
| Density<br>Reducing<br>Agent<br>(Hollow Glass<br>Spheres) | 21.01 | 23.39 | 21.01 | 23.37 | 21.01 | 23.43 |
| Suspension Aid<br>(Diutan) | 0.05 | 0.06 | 0.05 | 0.06 | 0.05 | 0.06 |

TABLE 4-continued

| | Test Sample 2 | | Test Sample 3 | | LCCA 2 | |
|---|---|---|---|---|---|---|
| Material | Amt | (g) | Amt | (g) | Amt | (g) |
| Fluid Loss<br>Agent<br>(Styrene<br>Butadiene<br>Latex) | 17.59 | 19.58 | 17.59 | 19.56 | 17.59 | 19.61 |
| Defoamer<br>(Hydrophobic<br>Silica) | 1.04 | 1.16 | 1.04 | 1.19 | 1.04 | 1.17 |
| Aqueous Base<br>Fluid<br>(Fresh Water) | 52.76 | 58.74 | 52.76 | 58.67 | 52.76 | 58.84 |

Each of Test Sample 2, Test Sample 3, and LCCA 2 were tested using a destructive compressive strength test. The compositions were cured at a low temperature of 107° F. (42° C.) in a water bath for 24 hours. Thereafter, the pressure required to crush each composition was determined. Test Sample 2, containing neither a traditional set accelerator nor a lithium-ion containing compound, had a compressive strength of 81 psi. Test Sample 3, containing only a traditional set accelerator, exhibited slightly better compressive strength of 160 psi. LCCA 2, containing only a lithium-ion containing compound, showed significantly improved compressive strength of 238 psi, an improvement of nearly 50% over the traditional set accelerator.

Example 5

In this example, an LCCA composition of the present disclosure was compared to cement compositions comprising traditional set accelerator additives, among other additives. Two compositions were prepared, Test Sample 4 and LCCA 3, as shown in Table 5. In Table 5, the amount ("Amt") is expressed as a percent by weight of the CAP cement, and the grams ("g") represent the amount of material included by weight.

TABLE 5

| | Test Sample 4 | | LCCA 3 | |
|---|---|---|---|---|
| Material | Amt | (g) | Amt | (g) |
| CAP Cement | 100 | 674.58 | 100 | 674.58 |
| Set Accelerator<br>(Sodium Aluminate) | 0.4 | 2.7 | — | — |
| Lithium-ion Compound<br>(Li$_2$So$_4$•H$_2$O) | — | — | 1.0 | 6.74 |
| Set Retarder<br>(Citric Acid) | 0.7 | 4.72 | 0.7 | 4.72 |
| Suspension Aid<br>(Diutan) | 0.1 | 0.67 | 0.1 | 0.67 |
| Fluid Loss Agent<br>(Styrene Butadiene Latex) | 11.73 | 79.12 | 11.79 | 79.12 |
| Defoamer<br>(Hydrophobic Silica) | 0.42 | 2.83 | 0.42 | 2.83 |
| Aqueous Base Fluid<br>(Fresh Water) | 37.99 | 256.3 | 37.99 | 256.3 |

Each of Test Sample 4 and LCCA 3 were tested using a standard thickening time test at a temperature of 36° C. (96° F.) and a pressure of 3000 psi, as shown in Table 6, and standard non-destructive compressive strength test as described above at a temperature of 36° C. (96° F.) and a pressure of 1480 psi, as shown in Table 7.

TABLE 6

| Test Sample 4 Thickening Time Test | | LCCA 3 Thickening Time Test | |
|---|---|---|---|
| Parameter | Results | Parameter | Results |
| 70 Bc Pump Time (hh:mm) | 03:58 | 70 Bc Pump Time (hh:mm) | 04:10 |

TABLE 7

| Test Sample 4 Non-Destructive Compressive Strength Test | | LCCA 3 Non-Destructive Compressive Strength Test | |
|---|---|---|---|
| Parameter | Results | Parameter | Results |
| 50 psi (hh:mm) | 03:49 | 50 psi (hh:mm) | 03:48 |
| 250 psi (hh:mm) | 10:52 | 250 psi (hh:mm) | 04:38 |
| 500 psi (hh:mm) | 19:10 | 500 psi (hh:mm) | 04:53 |
| 12 hour (psi) | 276 | 12 hour (psi) | 1195 |
| 24 hour (psi) | 867 | 24 hour (psi) | 1427 |

With reference to Tables 6 and 7, Test Sample 4 and LCCA 3 give comparable thickening times (03:58 and 04:10, respectively), however, the compressive strength development profiles are significantly different. Although the time to 50 psi is comparable for both, thereafter LCCA 3 demonstrates more rapid compressive strength development than does Test Sample 4. The time to 250 and 500 psi in LCCA 3 is 04:38 and 04:53, respectively, which reinforces the rapid compressive strength development and "right-angle" set behavior imparted by the lithium-ion compound. For comparison, the time to 250 and 500 psi in Test Sample 4 is 10:52 and 19:10, respectively—a notably slower strength development profile. The 12 hour and 24 hour compressive strength values for LCCA 3 are much higher than for Test Sample 4, and further support the improvements in compressive strength development provided by lithium-ion compounds.

The values from Tables 6 and 7 (and the tables above) demonstrate that incorporation of the lithium-ion compound(s) gives an improvement in compressive strength for designs having comparable pump times. The impact of the compressive strength development improvements derived from the lithium-ion compound(s) is, for example, reduced wait-on-cement (WOC) time that allows operation crews to progress with work (e.g., drilling) in shorter time required for cement to reach minimum strengths.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
   providing a lithium-containing cement admixture ("LCCA") having a density equal to or less than about 20 pounds per gallon (ppg), the LCCA comprising: a calcium aluminate phosphate cement,
   a lithium salt, wherein the lithium salt is present in an amount in the range of about 0.5% to about 1.0% by weight of the calcium aluminate phosphate cement to achieve a pump time of the LCCA of between about 90 minutes and about 250 minutes, wherein the lithium salt comprises lithium carbonate,
   an aqueous base fluid, and
   a set retarder present in an amount of about 0.01% to about 2.5% by weight of the calcium aluminate phosphate cement, wherein the set retarder is selected from the group consisting of citric acid, delta gluconolactone, tartaric acid, lignosulfate, a metal salt of lignosulfate, 2-acrylamide-2-methylpropane sulfonic acid/acrylic acid copolymer, 2-acrylamide-2-methylpropane sulfonic acid/maleic acid copolymer, itaconic acid, gluconic acid, oleic acid, phosphoric acid, uric acid, ammonium, an alkali metal, an alkaline earth metal, borax, a hydroxycarboxy acid, and any combination thereof;
   introducing the LCCA into a subterranean formation having a temperature of less than about 50° C. (120° F.); and
   forming a hydrated cement in at least a portion of the subterranean formation, wherein the hydrated cement has a compressive strength of between about 50 psi to about 500 psi in about 6 hours or less.

2. The method of claim 1, wherein the calcium aluminate phosphate cement has a calcium aluminate content in the range of about 20% to about 80% by weight of the calcium aluminate phosphate cement.

3. The method of claim 1, wherein the calcium aluminate phosphate cement has a phosphate content in the range of about 1% to about 20% by weight of the calcium aluminate phosphate cement.

4. The method of claim 1, wherein the calcium aluminate phosphate cement is present in an amount in the range of about 1% to about 99.99% by weight of the LCCA.

5. The method of claim 1, wherein the aqueous base fluid is present in an amount in the range of about 20% to about 80% by weight of the calcium aluminate phosphate cement.

6. The method of claim 1, wherein the lithium salt further comprises a lithium salt selected from the group consisting of a lithium chloride, a lithium chloride hydrate, a lithium bromide, a lithium bromide hydrate, a lithium fluoride, a lithium iodide, a lithium iodide hydrate, a lithium borate, a lithium hydroxide, a dilithium tetrabromonickelate, a dilithium tetrachlorocuprate, a lithium benzoate, a lithium cyclohexanbutyrate, a lithium formate, lithium hexafluoroarsenate, lithium hexafluorophosphate, lithium iodate, lithium metaborate, lithium phosphate, lithium perchlorate, lithium tetraborate, lithium tetrachloroaluminate, lithium tetrachloroaurate, lithium tetrachlorogallate, lithium tetrachloropalladate, lithium tetrafluoroborate, lithium trifluoromethanesulfonate, and any combination thereof.

7. The method of claim 1, wherein the LCCA further comprises an aluminosilicate.

8. The method of claim 1, wherein the LCCA further comprises a cement additive selected from the group consisting of a set accelerator, a suspension aid, a density reducing agent, a fluid loss control agent, a defoamer, and any combination thereof.

9. The method of claim 1, wherein the LCCA is foamed and further comprises a gas and a foaming agent.

10. A lithium-containing cement admixture ("LCCA") comprising:
a calcium aluminate phosphate cement;
a lithium salt, wherein the lithium salt is present in an amount in the range of about 0.5% to about 1.0% by weight of the calcium aluminate phosphate cement to achieve a pump time of the LCCA of between 90 and 250 minutes, and wherein the lithium salt comprises lithium carbonate;
an aqueous base fluid; and
a set retarder present in an amount of about 0.01% to about 2.5% by weight of the calcium aluminate phosphate cement, wherein the set retarder is selected from the group consisting of citric acid, delta gluconolactone, tartaric acid, lignosulfate, a metal salt of lignosulfate, 2-acrylamide-2-methylpropane sulfonic acid/acrylic acid copolymer, 2-acrylamide-2-methylpropane sulfonic acid/maleic acid copolymer, itaconic acid, gluconic acid, oleic acid, phosphoric acid, uric acid, ammonium, an alkali metal, an alkaline earth metal, borax, a hydroxycarboxy acid, and any combination thereof, and wherein the LCCA has a density equal to or less than about 20 pounds per gallon (ppg) and wherein the LCCA forms a hydrated cement having a compressive strength of between about 50 psi to about 500 psi in about 6 hours or less when introduced into a subterranean formation having a temperature of less than about 50° C. (120° F.).

11. The LCCA of claim 10, wherein the lithium salt is selected from the group consisting of a lithium chloride, a lithium chloride hydrate, a lithium bromide, a lithium bromide hydrate, a lithium fluoride, a lithium iodide, a lithium iodide hydrate, a lithium borate, a lithium hydroxide, a dilithium tetrabromonickelate, a dilithium tetrachlorocuprate, a lithium benzoate, a lithium cyclohexanbutyrate, a lithium formate, lithium hexafluoroarsenate, lithium hexafluorophosphate, lithium iodate, lithium metaborate, lithium phosphate, lithium perchlorate, lithium tetraborate, lithium tetrachloroaluminate, lithium tetrachloroaurate, lithium tetrachlorogallate, lithium tetrachloropalladate, lithium tetrafluoroborate, lithium trifluoromethanesulfonate, and any combination thereof.

12. A system comprising:
a wellhead with a tubular extending therefrom and into a subterranean formation having a temperature equal or less than about 50° C. (120° F.); and
a pump fluidly coupled to the tubular, the tubular comprising a lithium-containing cement admixture ("LCCA") having a density equal to or less than about 20 pounds per gallon (ppg) and comprising a calcium aluminate phosphate cement, a lithium-ion-containing compound comprising lithium sulfate, hydrates of lithium sulfate, lithium carbonate, or combinations thereof, wherein the lithium-ion-containing compound is present in an amount in the range of about 0.5% to about 1.0% by weight of the calcium aluminate phosphate cement to achieve a pump time of the LCCA of between about 90 minutes and 250 minutes, a set retarder present in an amount of about 0.01% to about 2.5% by weight of the calcium aluminate phosphate cement, wherein the set retarder is selected from the group consisting of citric acid, delta gluconolactone, tartaric acid, lignosulfate, a metal salt of lignosulfate, 2-acrylamide-2-methylpropane sulfonic acid/acrylic acid copolymer, 2-acrylamide-2-methylpropane sulfonic acid/maleic acid copolymer, itaconic acid, gluconic acid, oleic acid, phosphoric acid, uric acid, ammonium, an alkali metal, an alkaline earth metal, borax, a hydroxycarboxy acid, and any combination thereof, and an aqueous base fluid,
wherein the LCCA develops a compressive strength of between about 50 psi to about 500 psi in about 6 hours or less when introduced into a subterranean formation.

13. The system of claim 12, wherein the LCCA further comprises a lithium salt selected from the group consisting of a lithium chloride, a lithium chloride hydrate, a lithium bromide, a lithium bromide hydrate, a lithium fluoride, a lithium iodide, a lithium iodide hydrate, a lithium borate, a lithium hydroxide, a dilithium tetrabromonickelate, a dilithium tetrachlorocuprate, a lithium benzoate, a lithium cyclohexanbutyrate, a lithium formate, lithium hexafluoroarsenate, lithium hexafluorophosphate, lithium iodate, lithium metaborate, lithium phosphate, lithium perchlorate, lithium tetraborate, lithium tetrachloroaluminate, lithium tetrachloroaurate, lithium tetrachlorogallate, lithium tetrachloropalladate, lithium tetrafluoroborate, lithium trifluoromethanesulfonate, and any combination thereof.

* * * * *